United States Patent

[11] 3,632,410

[72] Inventor Edward J. Vargo
       Beachwood, Ohio
[21] Appl. No. 753,084
[22] Filed Aug. 16, 1968
[45] Patented Jan. 4, 1972
[73] Assignee TRW Inc.
       Cleveland, Ohio

[54] PREPARATION OF CLEAN METAL SURFACES FOR DIFFUSION BONDING
    5 Claims, No Drawings

[52] U.S. Cl. .................................................. 117/114 R,
                  29/492, 29/498, 117/50, 117/51, 117/131
[51] Int. Cl. .................................................. C23c 1/10
[50] Field of Search .......................................... 117/114 R,
                                                    131, 50, 51

[56] References Cited
UNITED STATES PATENTS

| | | | |
|---|---|---|---|
| 3,537,881 | 11/1970 | Corwin | 117/131 X |
| 453,882 | 6/1891 | Draper et al. | 117/131 |
| 526,836 | 10/1894 | Hilton | 117/50 |
| 622,009 | 3/1899 | Kennedy | 117/51 |
| 1,324,835 | 12/1919 | McCoy | 117/50 |
| 2,691,603 | 10/1954 | Klain | 117/114 X |
| 3,220,876 | 11/1965 | Moeller | 117/131 X |

FOREIGN PATENTS

| | | | |
|---|---|---|---|
| 939,609 | 10/1963 | Great Britain | 117/131 |

*Primary Examiner*—Alfred L. Leavitt
*Assistant Examiner*—J. R. Batten, Jr.
*Attorney*—Hill, Sherman, Meroni, Gross & Simpson

ABSTRACT: The method of cleaning a metal surface preparatory to bonding two surfaces together which involves treating the surface with an amalgam of at least one alkali metal whereby the alkali metal serves to reduce any stable oxides present on the surface, permitting the surface to become thoroughly wetted by the mercury of the amalgam.

PREPARATION OF CLEAN METAL SURFACES FOR DIFFUSION BONDING

BACKGROUND OF THE INVENTION

1. Field of the Invention

This invention is in the field of cleaning metals to provide an oxide-free surface so that two such surfaces can be bonded together as by means of diffusion bonding techniques.

2. Description of the Prior Art

Relatively recently, there has been a growing interest in the application of diffusion bonding processes to the problems of fabricating complex metal parts. Diffusion bonding, or diffusion welding as it is sometimes called, is a process by which a weld is made by means of the simultaneous application of heat and pressure, resulting in coalescence of two surfaces by diffusion controlled phenomena. Diffusion welding is performed at temperatures considerably below the melting point of the lowest melting base metal in the assembly, but at a high enough temperature to permit diffusion activated processes to occur. Pressure is applied during diffusion welding to assure intimate interfacial contact, but its magnitude is usually insufficient to cause appreciable deformation of the parts. Diffusion bonding is particularly useful where the shapes are intricate, as it is basically a low deformation process. The main advantages of a diffusion bonding process are the absence of melting and its attendant problems such as segregation, shrinkage stresses, and distortion. Up to now, the main disadvantages of the process are related to the economical and mechanical complexities of applying the process to fabricating a part.

Successful diffusion bonding requires exacting surface conditions. Surfaces must have specific finishes and be chemically cleaned to insure proper interfacial contact and to eliminate films which act as diffusion barriers. In many alloy systems, particularly those containing aluminum, titanium and boron, the surface oxide films which result are extremely stable and represent a definite impediment in the operation of the diffusion bonding process.

The required surface finish is usually obtained by machining, abrading, grinding or polishing. Removal of organic surface films is accomplished by washing in a suitable solvent such as alcohol, trichlorethylene, acetone, or detergents. Heretofore, oxide films have usually been removed by chemical etching or pickling.

SUMMARY OF THE INVENTION

The present invention provides an improved method for preparing the surface of a metal part for bonding by diffusion bonding although it would also be applicable to cleaning a metal part preparatory to bonding by other types of processes. The process of the present invention eliminates the stable oxides which have heretofore been the major obstacle in attaining good bonding at reasonable operating pressures, temperatures, and vacuum conditions. In its entirety, the process consists in first machining or grinding the surfaces to be joined and then cleaning with a commercial-type solvent to remove any residual matter. Next, the surfaces are wetted with mercury using an amalgam of mercury with an alkali metal which may be sodium, potassium, lithium or mixtures of these metals. The alkali metal reduces the complex oxides which are present on the mating surfaces, thus permitting instant wetting by the mercury of the amalgam. The mercury-wetted surfaces of the metal stay wetted until the pieces are installed in the diffusion bonding equipment, thereby protecting the metal from reoxidation at ambient conditions.

Evacuation of the diffusion treating chamber to the vacuum pressure used during diffusion bonding can be initiated without loss of surface protection because the vapor pressure of mercury at the ambient temperatures is low. Then, when heat is applied to the pieces, the mercury is removed and at this time intimate contact of the mating surfaces can be made, and the process of diffusion bonding initiated.

DESCRIPTION OF THE PREFERRED EMBODIMENTS

While the process of the present invention can be used to advantage in bonding similar or dissimilar metals to each other wherever oxide films are a problem, the process of the present invention is particularly suitable for use with the types of alloys which have come to be known as "superalloys" because these superalloys provide a particularly troublesome problem in the matter of forming stable oxides which are difficult to remove. Superalloys, as that term is presently used, encompass three families of alloy systems: nickel base, cobalt base and iron base alloys. Broadly speaking, nickel base superalloys may contain from 0 to 2 percent manganese, from 0 to 1.5 percent silicon, from 5 to 25 percent chromium, from 0 to 30 percent cobalt, from 0 to 10 percent molybdenum, from 0 to 15 percent tungsten, from 0 to 5 percent columbium, from 0 to 30 percent iron, from 0 to 5 percent titanium, from 0 to 9 percent aluminum, and from 0 to 0.05 percent boron, from 0 to 1.0 percent zirconium, and from 0 to 9 percent tantalum, with at least 35 percent of the alloy being nickel. Within this broader range, the nickel base superalloys with which the present invention has been found particularly effective are those which contain 1 to 4 percent titanium, 1 to 8 percent aluminum, and 0.005 to 0.05 percent boron, the other ranges of ingredients being those mentioned previously.

Cobalt base superalloys, broadly speaking, usually contain 0 to 2 percent manganese, 0 to 1 percent silicon, 5 to 25 percent chromium, 0 to 20 percent nickel, 0 to 5 percent molybdenum, 4 to 20 percent tungsten, 0 to 5 percent columbium, 0 to 10 percent iron, 0 to 5 percent titanium, 0 to 5 percent aluminum, 0 to 0.05 percent boron, 0 to 0.50 percent zirconium, 0 to 9 percent tantalum, with at least 35 percent of the alloy being cobalt. Most cobalt base superalloys contain from 10 to 20 percent nickel.

Iron base superalloys usually contain 0 to 2 percent manganese, 0 to 1 percent silicon, 20 to 45 nickel, 1 to 10 percent molybdenum, 0 to 5 percent tungsten, 0 to 2 percent columbium, 0 to 5 percent titanium, 0 to 1 percent aluminum, 0 to 0.25 percent boron, and the balance being iron in an amount of at least 35 percent by weight.

Specific example of these various superalloys are detailed in the following table, which should be taken merely as representative of the broad classes of alloys with which the present invention is particularly effective: The alkali metal which can be used is either sodium, potassium, lithium or mixtures of these metals. Because of its higher melting point and its greater expense, lithium is less preferred than either sodium or potassium. The most convenient alkali metal constituent consists of a mixture of sodium and potassium in such proportions that the melting point is not in excess of 30° C., permitting operation in liquid form at room temperature. Mixtures having melting points below about 30° C. extend from those having 25 to 85 atomic percent potassium (36.1 to 90.6 weight percent potassium). The eutectic between sodium and potassium occurs at 78 atomic percent potassium, and the eutectic temperature is −12.6° C.

NICKEL BASE SUPERALLOYS

| Hastelloy | C | Mn | Si | Cr | Ni | Co | Mo | W | Cb | Fe | Ti | Al | B | Zr |
|---|---|---|---|---|---|---|---|---|---|---|---|---|---|---|
| "713 C" | .12 | | | 12.5 | Bal. | | 4.2 | | 2.0 | | 0.8 | 6.1 | .012 | .10 |
| "B-1900" | .10 | | | 8.0 | Bal. | 10.0 | 6.0 | | (4.0 Ta) | | 1.0 | 6.0 | .015 | .10 |
| "D-979" | .05 | .25 | .20 | 15.0 | Bal. | | 4.0 | 4.0 | | 27.0 | 3.0 | 1.0 | .010 | |
| "GMR 235-D" | .15 | | | 15.5 | Bal. | | 5.0 | | | 4.5 | 2.5 | 3.5 | .050 | |

NICKEL BASE SUPERALLOYS — Continued

| Hastelloy | C | Mn | Si | Cr | Ni | Co | Mo | W | Cb | Fe | Ti | Al | B | Zr |
|---|---|---|---|---|---|---|---|---|---|---|---|---|---|---|
| "Hastelloy R-235" | .15 | | | 15.5 | Bal. | | 5.5 | | | 10.0 | 2.5 | 2.0 | | |
| "Hastelloy Alloy X" | .10 | .50 | .50 | 22.0 | Bal. | 1.5 | 9.0 | 0.6 | | 18.5 | | | | |
| "Inconel 718" | .04 | .20 | .30 | 18.6 | Bal. | | 3.1 | | 5.0 | 18.5 | 0.9 | 0.4 | | |
| "Inconel 722" | .04 | .55 | .20 | 15.0 | Bal. | | | | | 6.5 | 2.4 | 0.6 | | |
| "Mar M-200" | .15 | | | 9.0 | Bal. | 10.0 | | 12.5 | 1.0 | | 2.0 | 5.0 | .015 | .05 |
| "IN 100" | .18 | | | 10.0 | Bal. | 15.0 | 3.0 | | | | 4.7 | 5.5 | .014 | .06 |
| "Rene 41" | .09 | | | 19.0 | Bal. | 11.0 | 10.0 | | | 3.1 | 1.5 | .005 | | |

COBALT BASE SUPERALLOYS

| | C | Mn | Si | Cr | Ni | Co | Mo | W | Cb | Fe | Ti | Al | B | Zr |
|---|---|---|---|---|---|---|---|---|---|---|---|---|---|---|
| "L-605" | .10 | 1.50 | .50 | 20.0 | 10.0 | Bal. | | 15.0 | | | | | | |
| "Mar M-302" | .85 | | | 21.5 | | Bal. | | 11.0 | (9.0 Ta) | | | | .005 | .20 |
| "S-816" | .38 | 1.20 | .40 | 20.0 | 20.0 | Bal. | 4.0 | 4.0 | 4.0 | 4.0 | | | | |
| "WI-52" | .45 | .25 | .25 | 21.0 | | Bal. | | 11.0 | 2.0 | 2.0 | | | | |
| "X-40" | .50 | .75 | .75 | 25.5 | 10.5 | Bal. | | 7.5 | | | | | | |

IRON BASE SUPERALLOYS

| | C | Mn | Si | Cr | Ni | Co | Mo | W | Cb | Fe | Ti | Al | B | Zr |
|---|---|---|---|---|---|---|---|---|---|---|---|---|---|---|
| "Alloy 901" | .05 | .10 | .10 | 12.5 | 42.5 | | 5.7 | | | Bal. | 2.8 | 0.2 | .015 | |
| "A-286" | .05 | 1.35 | .50 | 15.0 | 26.0 | | 1.3 | | | Bal. | 2.0 | 0.2 | .015 | |
| "Discaloy" | .04 | .90 | .80 | 13.5 | 26.0 | | 2.7 | | | Bal. | 1.7 | 0.1 | .005 | |

The preferred technique for treating the metal surface with the amalgam consists in immersing the machined, solvent treated surface in the liquid alkali metal or alkali metal mixture, and then adding the mercury. The relative proportions between the mercury and the liquid alkali metal are not critical, and typically an amount of mercury equivalent to about one-quarter of the volume of the alkali metal can be used.

Further improvements are provided in the surface reaction which takes place between the oxides and the alkali metal if the reactions carried out in the presence of a small amount of water. The alkali metal, of course, reacts with water to liberate hydrogen which apparently assists in the reduction reaction.

The metal surfaces remain wetted with the mercury for a substantial period of time after such treatment. While the surfaces are so wetted, they can be put in the vacuum chamber for diffusion bonding. The conditions of diffusion bonding will vary depending upon the particular metal and the nature of the article being formed. For nickel base superalloys, the clamping pressures usually range from 1,000 to 2,000 pounds per square inch, at temperatures of 2,100° to 2,150° F., and treatment times of 4 to 18 hours under vacuum conditions.

The following specific examples illustrate the manner in which the process of the invention can be carried out, but the invention should not be construed as being limited thereto.

EXAMPLE I

Specimens cut from Rene 41 barstock were machined on one cross section surface. A specimen was placed in a small amount of a mixture of 22 percent sodium and 78 percent potassium with the machined surface face down and barely immersed. A quantity of mercury equivalent to about one-quarter by volume of the alkali metal was slowly added. A moderate reaction took place. After a few minutes the specimen was removed and the excess mercury was wiped off. The machined surface was wetted with the mercury, and could be diffusion bonded at temperatures and treatment times which were less than had to be used without the mercury pretreatment.

EXAMPLE II

A specimen of Rene 41 was immersed in a small pool of the same alkali metal mixture as in example I. A few drops of water were added and a reaction was initiated which was more energetic than in example I. The reaction was completed within 1 or 2 minutes and the specimen was removed from the amalgam. The immersed surface of the specimen was completely wetted with mercury even after wiping off the excess liquid metal. It was observed that the surface remained wetted with mercury for at least one hour at ambient conditions.

From the foregoing, it will be understood that the process of the present invention provides an improved manner for cleaning surfaces of metal to be bonded while avoiding metallurgical degradation of the base metal due to long exposure to elevated temperatures.

It should be evident that various modifications can be made to the described embodiments without departing from the scope of the present invention.

I claim as my invention:

1. The method of cleaning a metal surface to eliminate stable metal oxides therefrom which comprises immersing said surface in a liquid alkali metal bath, adding mercury to said bath in an amount sufficient to form a liquid amalgam with said alkali metal, holding said surface in said bath until the surface is free from stable oxides and wetted with mercury, and thereafter withdrawing the mercury wetted metal surface from said bath.

2. The method of claim 1 in which said alkali metal is sodium.

3. The method of claim 1 in which said amalgam contains both sodium and potassium.

4. The method of claim 1 in which said bath contains a mixture of sodium and potassium having a melting point not in excess of 30° C.

5. The method of claim 1 in which an amount of water is added to the bath sufficient to cause hydrogen generation therefrom to accelerate the reaction of the bath on the metal surface.

* * * * *